United States Patent
Kimura

(10) Patent No.: US 8,081,338 B2
(45) Date of Patent: Dec. 20, 2011

(54) FORM PROCESSING APPARATUS AND METHOD

(75) Inventor: Mitsuo Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1086 days.

(21) Appl. No.: 11/749,557

(22) Filed: May 16, 2007

(65) Prior Publication Data

US 2007/0279691 A1  Dec. 6, 2007

(30) Foreign Application Priority Data

May 30, 2006 (JP) .................................. 2006-150588

(51) Int. Cl.
*G06F 3/12* (2006.01)
(52) U.S. Cl. ...................... 358/1.16; 358/1.15; 358/1.17
(58) Field of Classification Search .......... 358/1.13–1.18
See application file for complete search history.

(56) References Cited

U.S. PATENT DOCUMENTS

| 5,923,013 | A  | * | 7/1999 | Suzuki et al. ................. 235/375 |
| 6,437,869 | B1 | * | 8/2002 | Matoba ........................ 358/1.13 |
| 2005/0068566 | A1 | * | 3/2005 | Nishiguchi .................. 358/1.15 |
| 2005/0132287 | A1 | * | 6/2005 | Matsuzawa et al. .......... 715/527 |
| 2006/0217826 | A1 | * | 9/2006 | Matsuya ........................ 700/90 |

FOREIGN PATENT DOCUMENTS

| JP | 08-096046 A | | 4/1996 |
| JP | 2002337425 A | * | 11/2002 |
| JP | 2005-202511 A | | 7/2005 |

* cited by examiner

*Primary Examiner* — Chan Park

(57) ABSTRACT

A form processing apparatus receives input data from an external form processing system via an operating system. When there is a request to print form data, the form processing apparatus adds an identifier to the form data, and then transfers the form data to the operating system. The form processing apparatus includes an identifier determination unit configured to receive data output from the operating system, and to determine whether the identifier has been added. When it is determined that the identifier has not been added, the data output from the operating system are saved in a saving unit, as form data from the external form processing system.

18 Claims, 17 Drawing Sheets

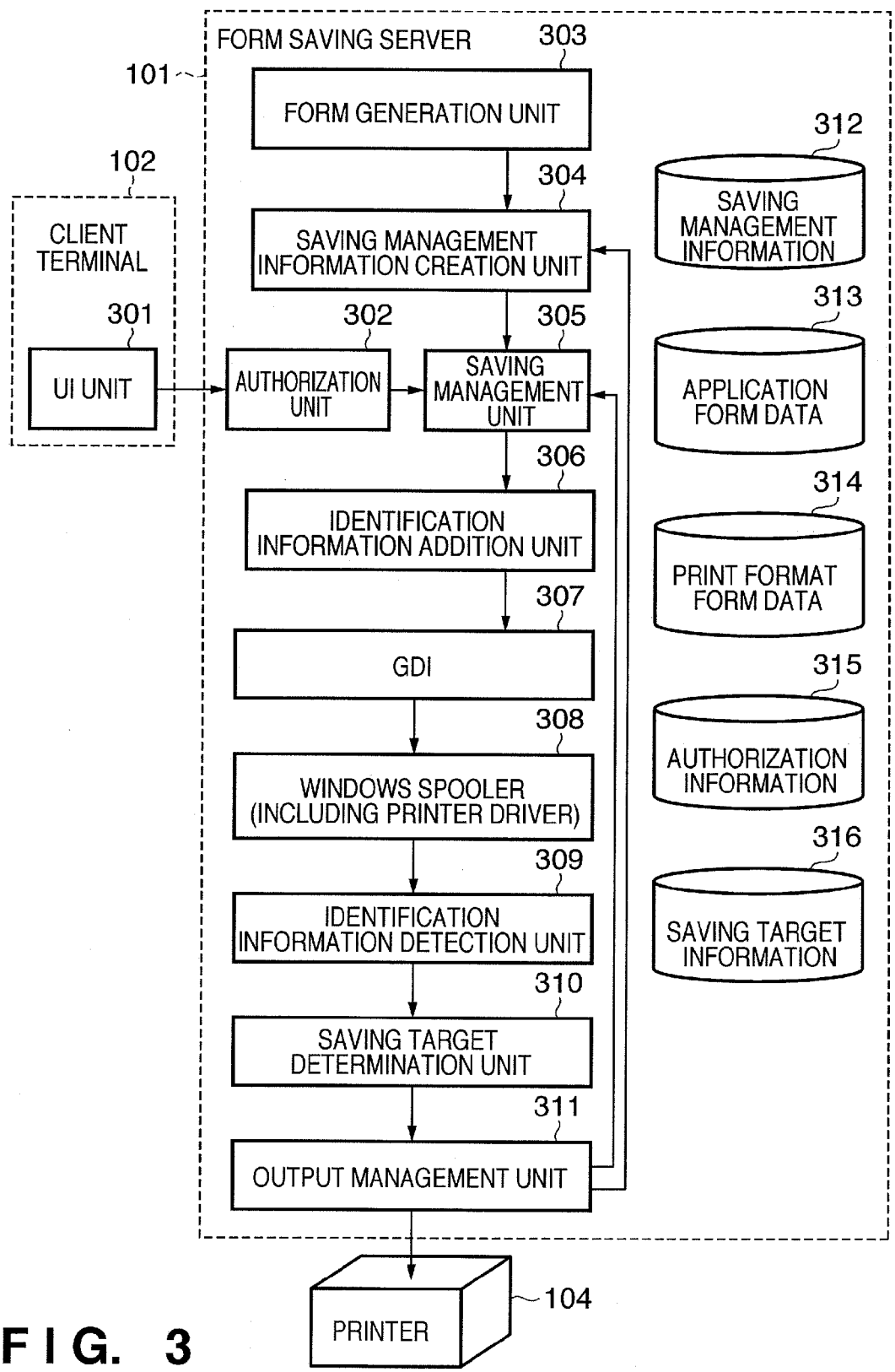
F I G. 3

FIG. 14

| | FORM NAME | RECEPTION DATE/TIME | NUMBER OF PAGES | SIZE | PRINT NUMBER |
|---|---|---|---|---|---|
| ☐ SAVED FORM | | | | | |
|   ☐ NON-PRINTED FORM | FORM 1 | 2005/7/11 18:09:10 | 1 | 27800 | 0 |
|   ☐ PRINTED FORM | FORM 1 | 2005/7/11 18:09:10 | 1 | 27800 | 0 |
| ☐ PDL SAVED FORM | FORM 1 | 2005/7/11 18:09:10 | 1 | 27800 | 0 |
|   ☐ NON-PRINTED FORM | FORM 1 | 2005/7/11 18:09:10 | 1 | 27800 | 0 |
|   ☐ PRINTED FORM | FORM 1 | 2005/7/11 18:09:10 | 1 | 27800 | 0 |
| | FORM 1 | 2005/7/11 18:09:10 | 1 | 27800 | 0 |
| | FORM 1 | 2005/7/11 18:09:10 | 1 | 27800 | 0 |
| | FORM 1 | 2005/7/11 18:09:10 | 1 | 27800 | 0 |
| | FORM 1 | 2005/7/11 18:09:10 | 1 | 27800 | 0 |
| | FORM 1 | 2005/7/11 18:09:10 | 1 | 27800 | 0 |

FORM PROCESSING APPARATUS AND METHOD

BACKGROUND OF THE INVENTION

1. Field of the Invention

The present invention relates to processing schemes that, for example, are capable of printing recorded form data or the like.

2. Description of the Related Art

Conventionally, form printing systems are known that merge data added afterward, the data describing a variable data portion, into an output format created in advance such as a form or the like, and print the merged data. Recently, form printing systems have been proposed that include a form saving server that saves and manages form data created by merging the output format and the variable data portion. A list of form data saved on the form saving server is displayed on a user interface (UI) on a client terminal, and a user selects form data and gives the instruction for various printing settings for the selected form data, and printing is executed for that form data. Thus, printing can be performed with the addition of desired print settings, such as, for example, a duplex designation or a paper cassette designation, for a printer managed by the form processing system (for example, see Japanese Patent Laid-Open No. 2005-202511).

A user newly introduced to a preexisting form printing system may have assets such as form formats that were accumulated in the past. In that case, it often may be necessary for those assets to coexist with an older legacy form processing system, without completely switching over to the new system. The legacy form processing system may have inferior functionality in comparison to the newly introduced form processing system, for example lacking a function to save and manage form data simply by executing printing. Even assuming that the legacy form processing system was provided with a saving management function, the user is inconvenienced by the necessity to manage form data with a plurality of form processing systems. Thus, there is a demand to be able to use a newly introduced form processing system to centrally save and manage even form data created with a preexisting form processing system.

SUMMARY OF THE INVENTION

An embodiment of the present invention is provided to overcome or at least mitigate drawbacks associated with the conventional systems described above. More specifically, according to an aspect of an embodiment, a form processing scheme is capable of managing form data in a plurality of form processing systems or a plurality of sources, such as form data produced with a preexisting form processing system, in a unified manner with a single form processing system.

According to an aspect of the invention, an embodiment is directed to a form processing apparatus comprising: an input unit configured to receive input data from an external form processing system via an operating system; an identification information addition unit configured to, when there is a request to print form data, add an identifier to the form data, and then transfers the form data to the operating system; an identifier determination unit configured to receive data output from the operating system, and determines whether the identifier has been added; and an output management unit configured to, when the identifier determination unit has determined that the identifier has not been added, save data output from the operating system in a saving unit, as form data from the external form processing system.

According to an aspect of the above configuration, it is possible to provide a form processing scheme capable of managing form data in a plurality of form processing systems, in a unified manner with a single form processing system.

Further features of the present invention will become apparent from the following description of exemplary embodiments with reference to the attached drawings.

BRIEF DESCRIPTION OF THE DRAWINGS

FIG. 3 shows the detailed configuration of the form saving server of the form printing system according to an embodiment of the invention.

FIG. 14 shows an example of a form list displayed in a UI unit of a client terminal of the form printing system according to an embodiment of the invention.

DESCRIPTION OF THE EMBODIMENTS

The following is a description of embodiments of the present invention with reference to the attached drawings. Described first is a form printing system upon which an embodiment of the invention is premised.

First Embodiment

<System Configuration>

Figure 1:
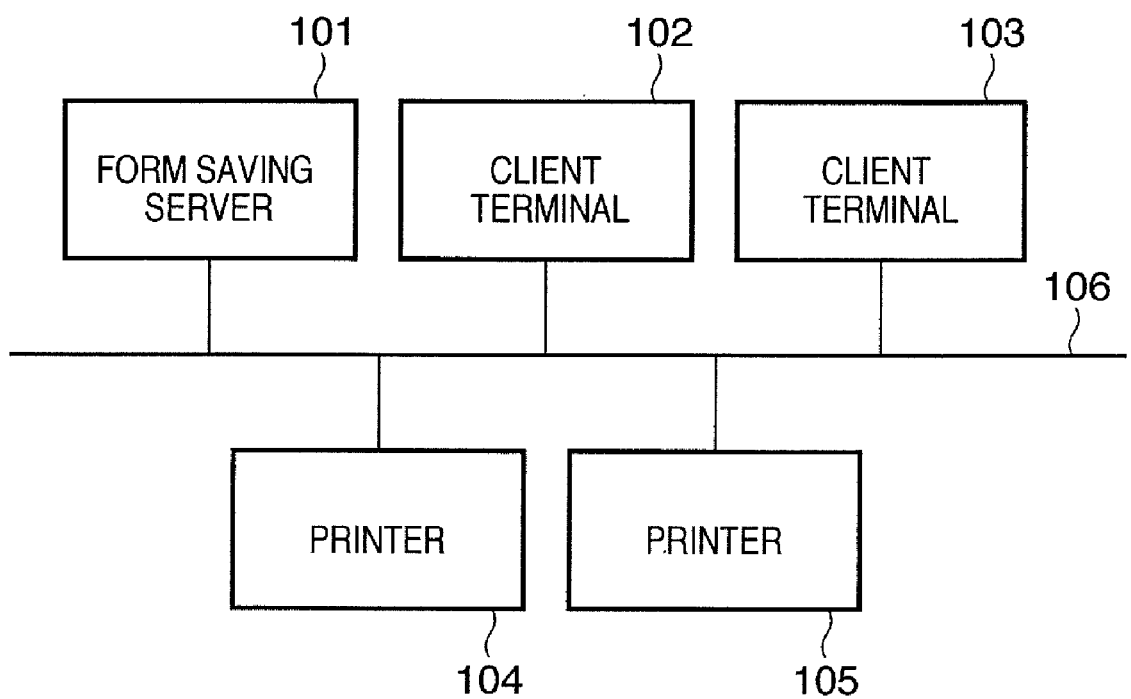
FIG. 1 shows the overall configuration of a form printing system according to an embodiment of the invention.

FIG. 1 shows the overall configuration of a form printing system according to an embodiment of the invention. In FIG. 1, client terminals 102, and 103, a form saving server 101, and printers 104 and 105 are connected to each other via a communications line 106. In FIG. 1, a number of the client terminals 102 and 103 and the printers 104 and 105 are connected (in this example, only two client terminals and two printers are shown, for the sake of convenience).

The communications line 106 is a communications network. The communications line 106, for example, is realized by a LAN such as an internet or intranet, a telephone line, a dedicated line, an ATM or frame relay, a communications satellite line, a cable television line, a data broadcasting wireless line, or the like. The communications line 106 may take any form capable of sending and receiving data, and the means of communications from the client terminals 102 and 103 to the form saving server 101, and the means of communications from the form saving server 101 to the printers 104 and 105, may differ.

The client terminals 102 and 103, for example, are constituted from a desktop personal computer, notebook personal computer, mobile personal computer, PDA (personal digital assistant), or the like, but may also be a portable telephone equipped with a program function (such as i-mode™ or the like).

The printers 104 and 105 are printers capable of connecting to a network (for example, such as laser printers). They may also be printers in which an inkjet system is adopted, or digital multifunction peripherals provided with copy, facsimile, and printing functions.

Figure 2:
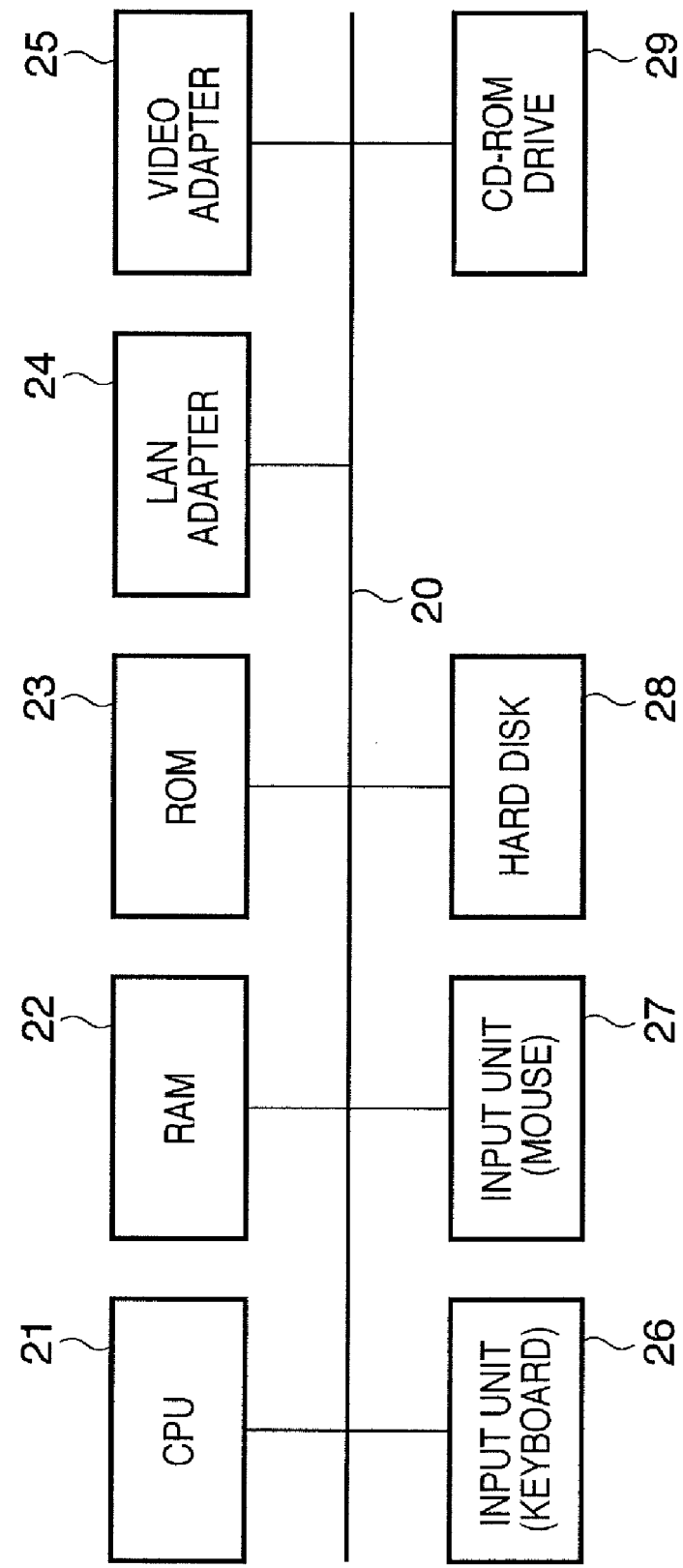
FIG. 2 is a block diagram showing the basic hardware configuration of a form saving server, a client terminal, and a printing apparatus of the form printing system according to an embodiment of the invention.

FIG. 2 is a block diagram showing the basic hardware configuration of the form saving server 101 and the client terminals 102 and 103 in FIG. 1. In FIG. 2, a CPU 21, a RAM 22, a RAM 23, a LAN adapter 24, a video adapter 25, input units (a keyboard 26 and a mouse 27), a hard disk 28, and a CD-ROM drive 29 are respectively connected to each other via a system bus 20. The system bus 20, for example, is constituted from a PCI bus, an AGP bus, a memory bus, and the like. Chips for connecting between each bus, a keyboard interface, and an input-output interface such as a so-called SCSI or ATAPI interface are omitted from FIG. 2.

The CPU 21 performs various computations such as the four basic operations of arithmetic, comparative computations, and the like based on programs of an operating system and application programs, and performs control of the hardware. In the RAM 22, programs of an operating system and application programs read from the hard disk 28 or a storage medium such as a CD-ROM, CD-R, or the like loaded in the CD-ROM drive 29. These programs are executed by the CPU 21.

In the ROM 23, a so-called BIOS or the like is stored that controls input-output to the hard disk 28 or the like in cooperation with the operating system. The LAN adapter 24 performs communications with an external apparatus connected via a network in cooperation with a communications program of the operating system controlled by the CPU 21. The video adapter 25 generates an image signal that is output to a display apparatus. The keyboard 26 and the mouse 27 are used to input instructions to the client terminals 102 and 103.

An OS (operating system) and application programs (for example, such as a form printing system program according to the invention) are stored on the hard disk 28. Also saved on the hard disk 28 are form data files, saving management information including attributes of the form data, authorization information used as a foundation for user authorization, and saving target information used as a reference for saving determination.

The CD-ROM drive 29 is used to install application programs on the hard disk 28 by loading a storage medium such as a CD-ROM, CD-R, or CD-R/W in the CD-ROM drive 29. A CD-R drive, CD-R/W drive, or MO drive or the like may be used instead of a CD-ROM drive.

FIG. 2 also shows a portion of the hardware of a printer. However, in the case of a printer, a print engine and a control for the print engine are provided, the printer does not have a magneto-optical disk, and the human interface device is limited to a touch panel or the like.

<Functional Blocks of Form Processing System>

FIG. 3 is a functional block diagram showing the detailed configuration of the form saving server 101 in the form printing system in FIG. 1. In an embodiment, functional blocks and data blocks shown in FIG. 3 are realized by a CPU executing a program, and a storage medium such as a hard disk on which data or the like is saved.

The client terminal 102 acquires a list of form data 313 that has been saved on the form saving server 101 from the form saving server 101 via the communications line 106. The client terminal 102 is also provided with a UI unit 301 that displays the acquired list of form data 313 on the client terminal 102. With the UI unit 301, a user selects the form data 313 and instructs the form saving server 101 to execute printing.

The form saving server 101 is provided with an authorization unit 302 for determining whether or not to authorize a request (a print request or form data list display request) from the client terminal 102 based on authorization information 315. In particular, with respect to a print request, in the case that the authorization unit 302 received a print request for designated form data from among the save form data, and authorized the print request based on the authorization information, the authorization unit 302 creates a print job for form data to which identification information has been added. As for authorization, the authorization unit 302 determines whether or not to authorize a request based on a user ID included in the request, an access right classification, and the authorization information 315, shown in FIG. 17 described below. Also provided is a form generation unit 303 that generates the form data 313. Also provided is a saving management information creation unit 304 that creates saving management information 312 for saving and managing the form data 313 generated with the form generation unit and print data acquired with an output management unit. The saving management information is saved associated with the form data, and is referenced for a search of the form data or the like. The saved form data includes form data generated with the form generation unit 303 (referred to as application form data), and form data in a format that has been converted to print data (referred to as print format form data).

The application form data is compatible with a new form processing system (a first form processing system), and the print format form data is compatible with a former form processing system (a second form processing system). In an embodiment, a configuration that relates to form data in the above two formats is described as an example in which form data that also includes form data generated with a preexisting form processing system is managed in an integrated fashion with a single form processing system. Of course, the invention is not limited to a case of the above form data generated with the form generation unit 303 (referred to as application form data) and form data in a format that has been converted to print data (referred to as print format form data).

Also provided in the form saving server 101 are a saving management unit 305 that performs saving management of the form data 313 and saving management of print data format form data 314, and an identification information addition unit 306 that adds identification information to a print job name when printing of the form data 313 saved in the saving management unit 305 is performed. Storage means for the saving management information 312, the application form data 313, the print data format form data 314, the authorization information 315, and saving target information 316 are also present, and these storage means are included in the saving management unit 305. Further provided is an identification information detection unit 309 that determines whether or not an identifier has been added to the print job name. Also provided is an output management unit 311 that receives print data that has been converted with a print spooler 308 provided by the operating system (OS), sends the received print data to the printer 104, and saves the received print data in the saving management unit 305. Also provided is a saving target determination unit 310 that determines whether or not data is print data to be saved, referencing the saving target information 316. It should be noted that in the above description, it was stated that print data is sent to the printer 104, but actual data communications are performed by communication hardware of the computer. The output management unit 311 allows this communication hardware to perform data communication. The expression "send" used below may indicate processing whereby the output management unit allows communication hardware to perform data communication, and it may indicate the data communication process of the communication hardware itself.

A GDI (graphic device interface) 307 is a programming interface provided by the OS in order for an application program to generate print data to be sent to a printer. The GDI 307 may also be referred to as a graphic engine. A unit of print processing is referred to as a print job. A print job is expressed in a form added to a print job header in print data. The print data output from the GDI includes the format of the print job, with a job header added. The spooler 308 spools print jobs, and converts print jobs to print data using a printer driver. The GDI 307 also includes an interface that directly inputs converted print data to the spooler 308, and in that case, the spooler 308 only performs processing to add a job header to the converted print data that has been input by the application program. In this case, the print job information may be created at that time with the OS, or may be created from the saving management information and input to the spooler 308.

In this embodiment, the spooler 308 is a Windows™ spooler provided by a Windows™ operating system.

In an embodiment, the form generation unit 303 is included in the form saving server 101, but a configuration may also be provided in which the form generation unit 303 is executed in a separate device, and sends the form data 313 to the saving management information creation unit 304 via the communications line 106.

<Printing Form Generated by Form Generation Unit 303>

Figure 4:
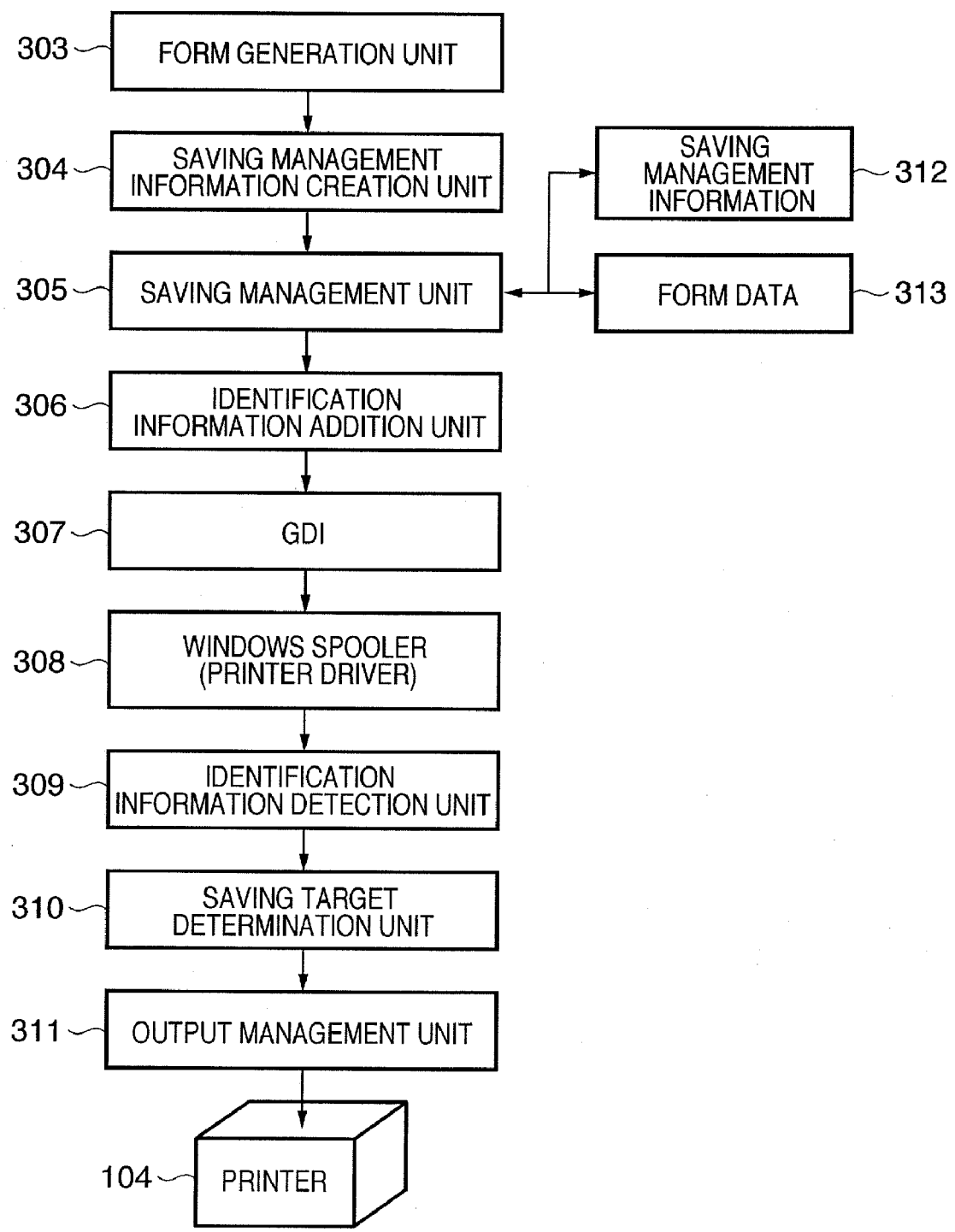
FIG. 4 shows the flow of processing in which generated form data is saved, and printing processing is executed in the form printing system according to an embodiment of the invention.

FIG. 4 shows the flow of processing in which the generated form data 313 is saved and print processing is executed in the form printing system in FIG. 1, with the configuration of the form saving server 101 shown in FIG. 3. The form data 313 generated by the form generation unit 303 is input to the saving management information creation unit 304. The saving management information creation unit 304 extracts data to be used as an index from the form data, creates the saving management information 312, and transfers it to the saving management unit 305 along with the form data. The saving management unit 305 saves the form data 313 and the saving management information 312 in association. For example, they are associated using a form data file name included in the saving management information 312.

The form data 313 saved by the saving management unit 305 is referenced according to a client request, and becomes the object for printing. When there is a request to print the form data 313, that print data is transferred to the identification information addition unit 306, and identification information is added to the print job name. In this example, the print job name is one parameter transferred to the GDI. This identification information (identifier) indicates whether or not the form data to be printed was being managed by the new form processing system. More specifically, a state in which identification information has not been added corresponds to a case in which the form data to be printed was not yet being managed by the saving management unit 305 or the like. For example, the case of a print request from a preexisting form processing system 701 in FIG. 7 described below indicates a print request for form data that was not yet being managed by the new form processing system.

The print data having a print job name to which identification information is added is transferred to the GDI 307 by the identification information addition unit 306. The GDI 307 and the printer driver 308 convert the form data to a print data format supported by a printer. When the printer supports a PDL, conversion is made to print data described with that PDL. The print data is temporarily saved by a spooler provided by the operating system. That print data is temporarily input to the identification information detection unit 309 without being sent directly to a printer. The identification information detection unit 309 determines whether or not identification information has been added to the print job name by analyzing the print job name. In the case shown in FIG. 4, the source of the print request is the form generation unit 303 of the new form processing system, so identification information has been added. In this case, the print data is transferred to the output management unit 311 and sent to a printer 104 without being saved, despite passing through the saving target determination unit 310. As a result a form is printed.

Figure 5:
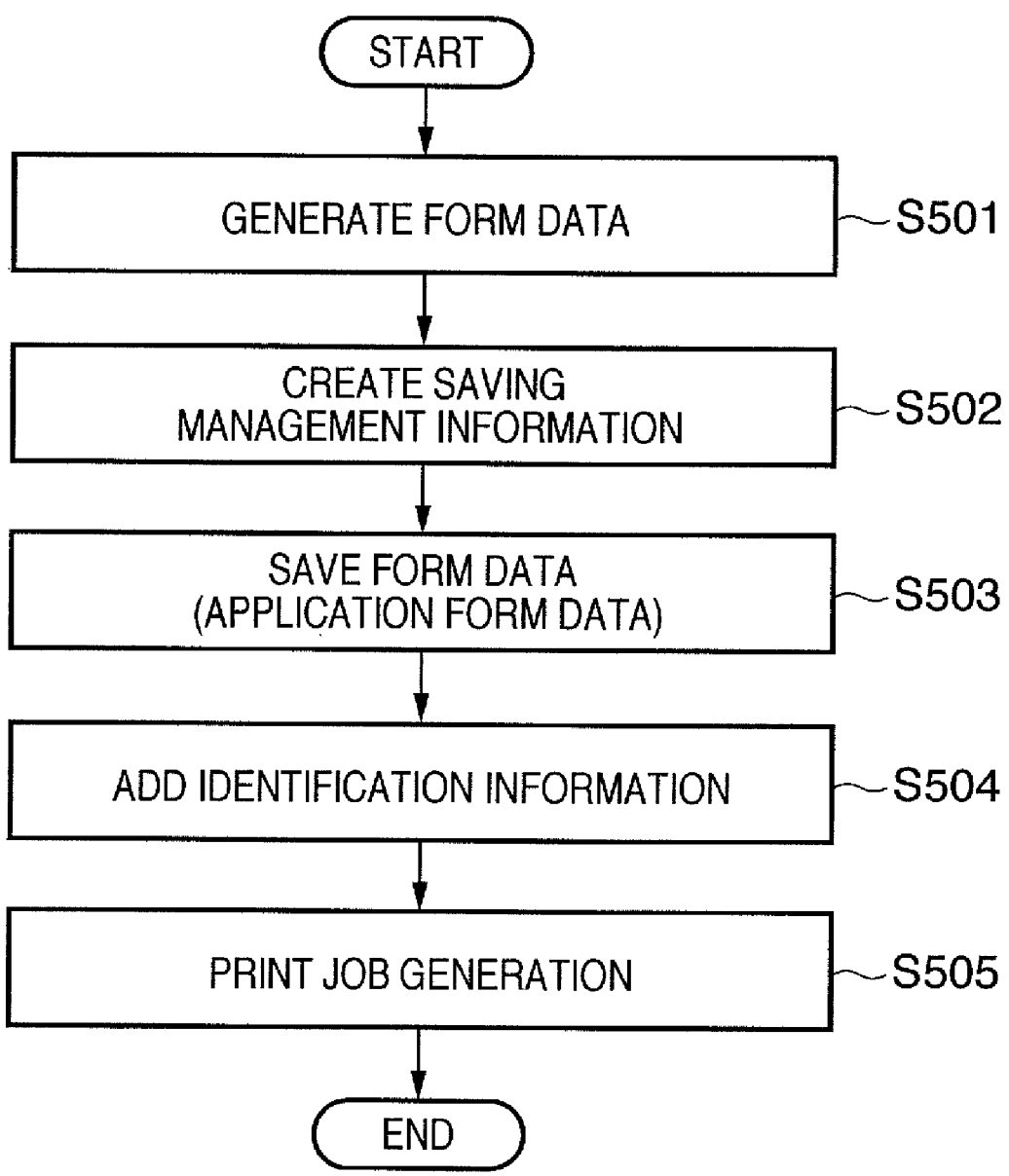
FIG. 5 is a flowchart showing the flow of processing in which form data generated by a form generation unit is saved, and a print job is generated in the form printing system according to an embodiment of the invention.

FIG. 5 is a flowchart showing the flow of processing in which form data 313 generated by the form generation unit 303 is saved, and a print job is generated. In this flowchart, S501 is executed with the form generation unit 303, S502 is executed with the saving management information creation unit 304, S503 and S504 are executed with the identification information addition unit 306, and S505 is executed with the saving management unit 305.

The form data 313 is generated in S501, and in S502, saving management information is created in order to manage a saving of the form data 313. The saving management information is described with reference to FIG. 10. In S503, the saving management unit 305 saves the form data 313 (application form data) in a saving directory that has been set in advance, and the saving management information is saved together with the form data 313. At this time, in S504, identification information indicating printing of the form data 313 is added to the print job name. In S505, a print job with a name to which identification information has been added is generated via the GDI 307. Print processing is executed according to the flowcharts in FIGS. 8 and 9 described below for a print job that has been input to the Windows™ spooler 308 according to the flowchart in FIG. 5.

Figure 6:
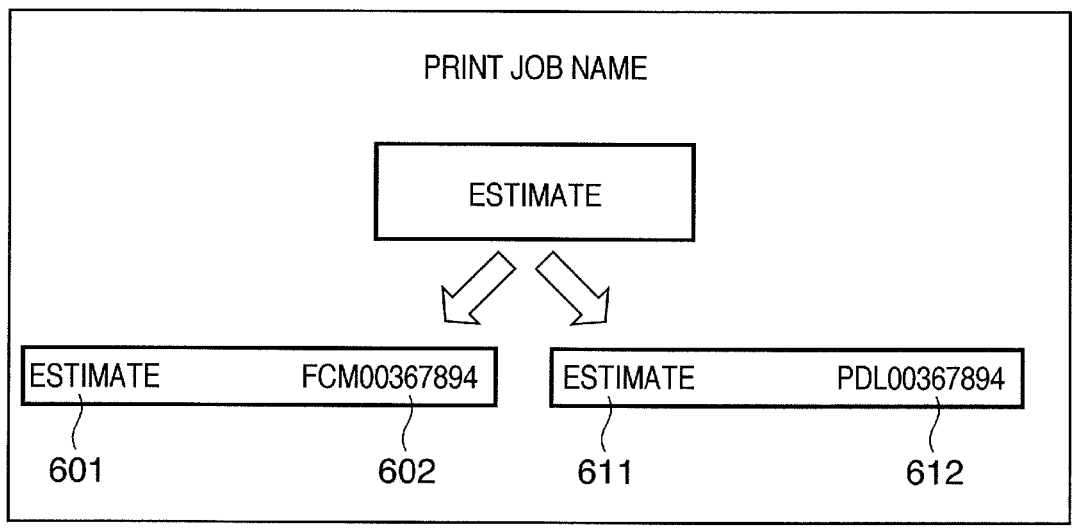
FIG. 6 shows an example of identification information added to a print job name by an identification information addition unit in the form printing system according to an embodiment of the invention.

FIG. 6 shows an example of identification information added to a print job name by the identification information addition unit 306. In this example, after a print job name "estimate" (601, 611) are added white space, a three character identifier that indicates a print of the application form data 313 or a print of the print format form data 314, and a seven digit form ID (602, 612). In the following description, the identification information is added to the end of the job name character string, and is handled by the operating system as a portion of the print job name. However, the invention is not limited to a method in which the identifier is added to the end of the job name character string. For example, the identifier may be added after the job name as a kind of extension. In the following description, an example is given of a case in which an extension is added to the end of the job name character string.

Figure 7:
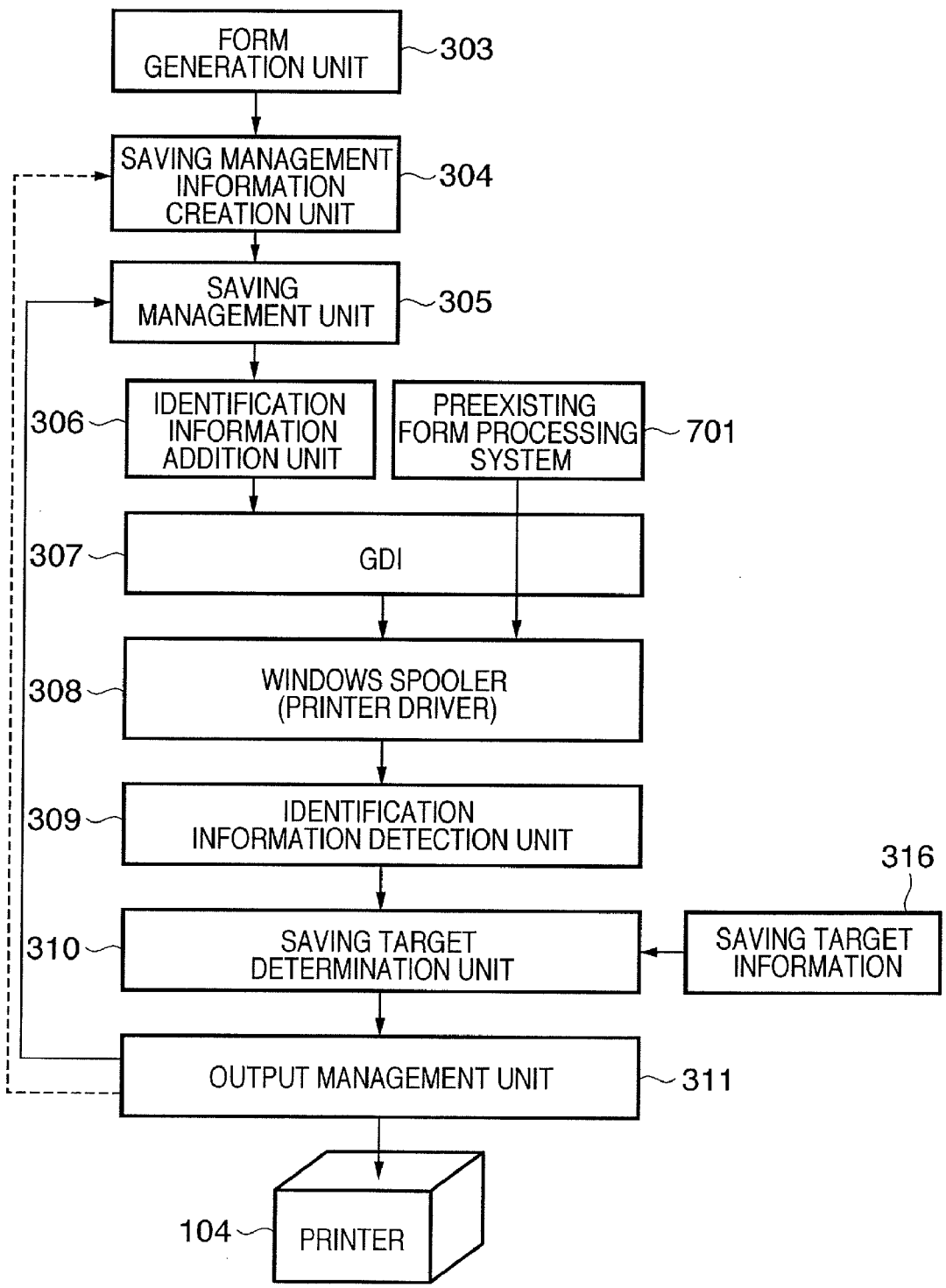
FIG. 7 shows the flow of processing in which printing processing is executed by a preexisting form processing system, and print data is saved in a saving management unit in the form printing system according to an embodiment of the invention.

FIG. 7 shows the flow of processing in which printing processing is executed by a preexisting form processing system (may also be a printing application such as MS-Word™ or the like) 701, and print data is saved in the saving management unit 305, in the configuration of the form saving server 101 shown in FIG. 3. When there is a print request for the preexisting form data (may also be ordinary application data), that data is transferred from the application to the operating system of the GDI 307, the printer driver 308, and the like. Here, the preexisting form data is not operating with the new form processing system (for example the identification information addition unit 306), so an identifier is not added to the print job name generated from this preexisting form data. After the form data has been transferred to the operating system and converted to print data format, the identification information detection unit 309 determines whether or not identification information is included in the job name. In FIG. 7, identification information is not added, and so is not indicated. When there is no identification information, that print data is a candidate for saving. The saving target determination unit 310 determines whether the recorded data name is included in the print data job name that has been input from the identification information detection unit 309 by, for example, referencing a data name as saving target information previously recorded. If the saving target determination unit 310 determines that the recorded data name is included in the print data job name, that print data is data to be saved. In that case, the print job information for the print data is transferred to the saving management information creation unit 304. As a result, saving management information is created for the transferred print data based on the print job information, and saved by the saving management unit 305 in association with the original print data.

Figure 8:
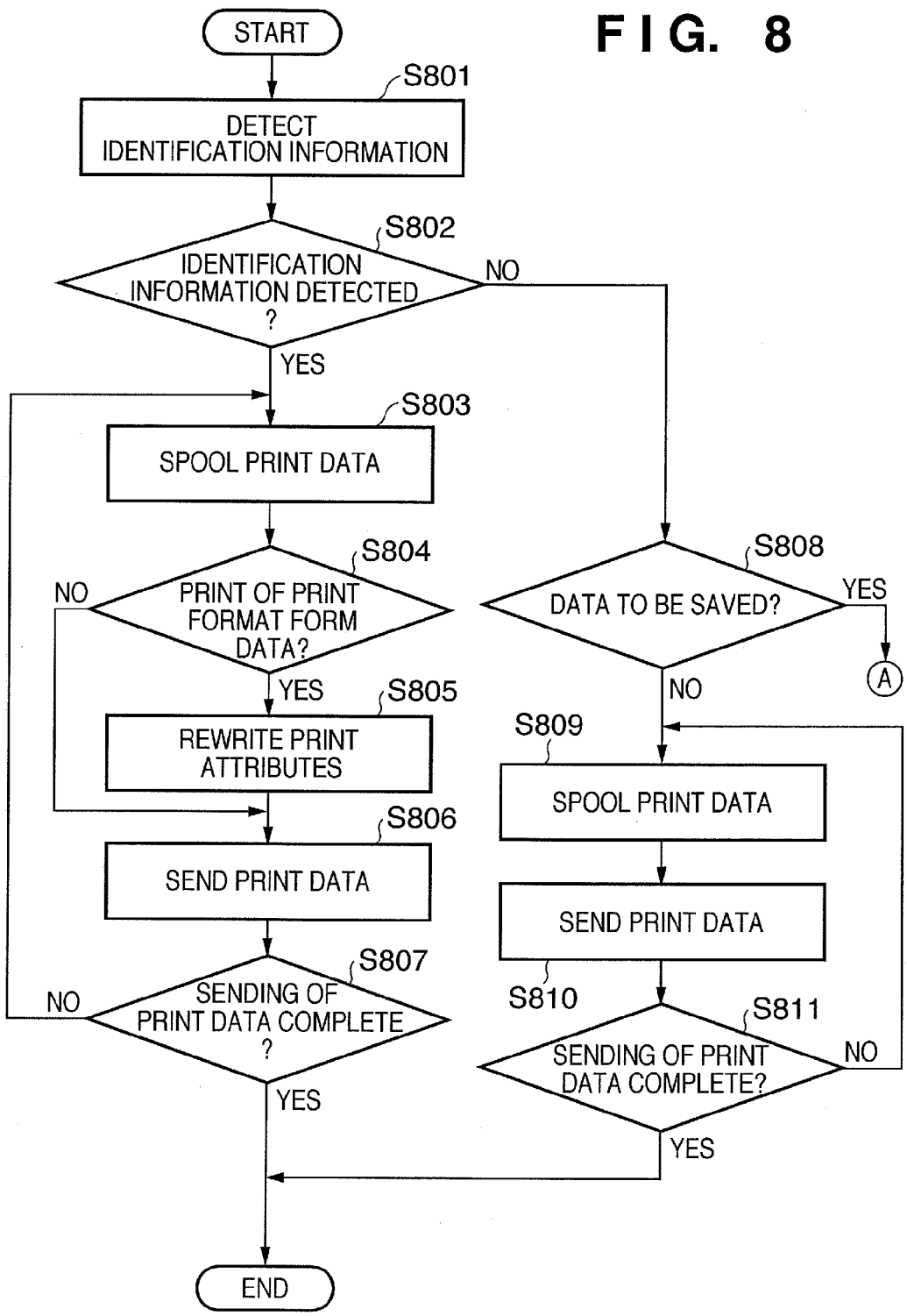
FIG. 8 is a flowchart showing the flow of processing in which print data converted from an input print job by a Windows™ spooler is sent to a printer, or saved in the saving management unit, in the form printing system according to an embodiment of the invention.
Figure 9:
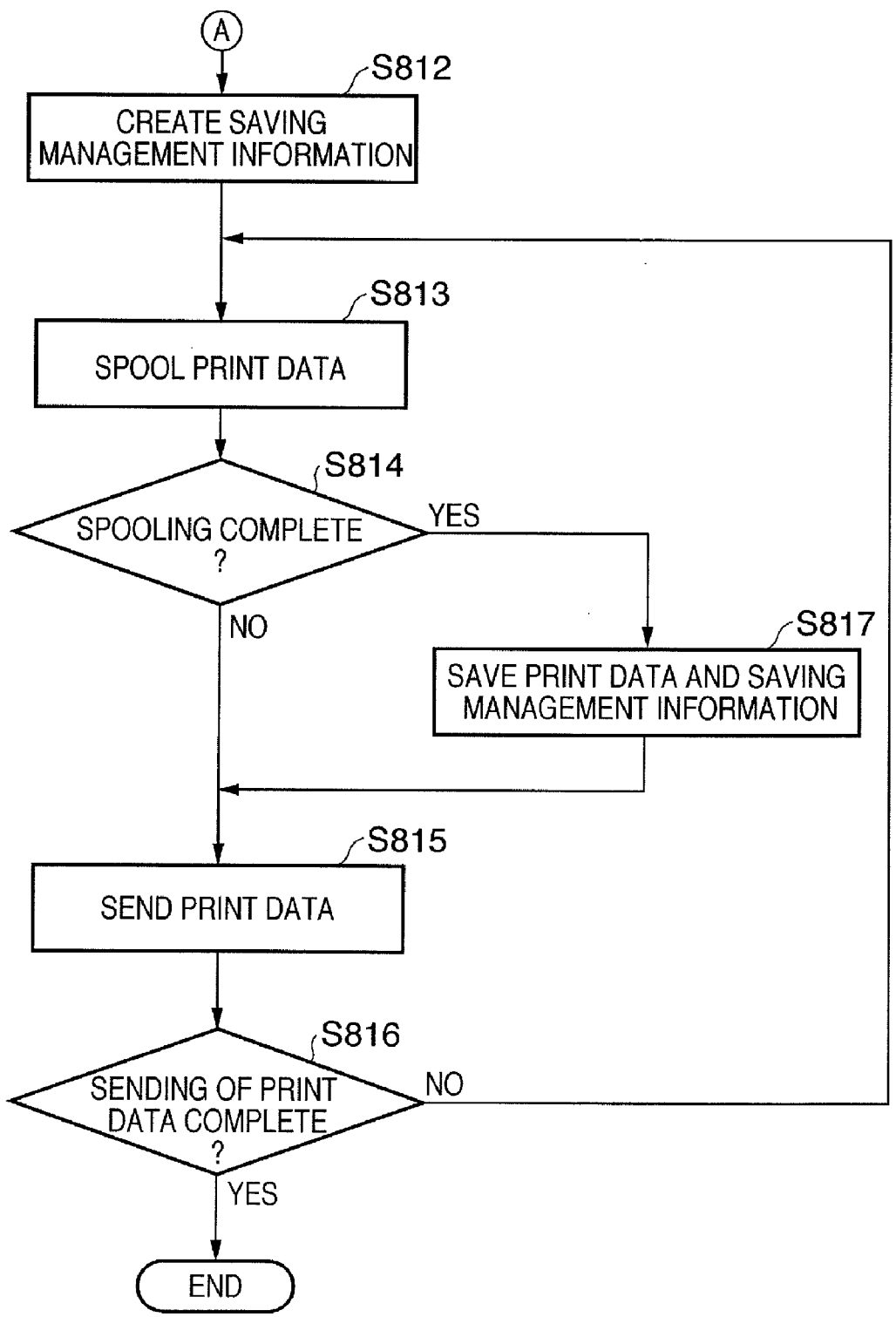
FIG. 9 is a flowchart showing the flow of processing in which print data converted from an input print job by a Windows™ spooler is sent to a printer, or saved in the saving management unit, in the form printing system according to an embodiment of the invention.

FIGS. 8 and 9 are flowcharts showing the flow of processing in which print data converted by a printer driver (the Windows™ spooler 308) and saving management information is sent to the printer 104, or saved in the saving management unit 305. With the flow shown in FIG. 5, or from a preexisting form processing system, a print job is input to the operating system (GDI). In the flowcharts in FIGS. 8 and 9, S801 and S802 are executed with the identification information detection unit 309, and S808 is executed with the saving target determination unit 310. S803 to S807, S809 to S811, and S813 to S816 are executed with the output management unit 311, S812 is executed with the saving management information creation unit 304, and S817 is executed by the saving management unit 305.

In S801, the identification information detection unit 309, which has received the print data generated by the Windows™ spooler 308 and the print job information and functions as an identifier determination means, attempts to detect identification information that has been added to a print job name. In S802, if it is determined that identification information has been added, print data output from the OS is output to a printer without causing a saving means to save that print data in the saving means. Thus, specifically, the output management unit 311 spools print data in S803. This spooling may be realized using a spooler other than a system spooler (the Windows™ spooler 308). Next, in S804, a determination is performed of whether the data class indicated by the identification information is the print format form data 314 or application form data. This determination is performed by processing that determines the class of the identification information, shown in FIG. 6, separate from and in addition to the determination of whether identification information is present. More specifically, an analysis is made of whether the identification information includes a PDL or includes an FCM. When the data class is determined to be the print format form data 314 in S804, in S805 the print data is analyzed and print settings information is replaced with designated print settings, and processing proceeds to S806. Print settings include, for example, settings for duplex printing, paper cassette, layout, and the like. When the data class is determined not to be the print format form data 314 in S804 (that is, determined to be printing of the application form data 313), the processing proceeds to S806. It should also be noted that the determination in S804 may be omitted, thus not including the class of form data in the identification information as shown in FIG. 6.

In S806, the print data spooled in S803 is sent to the printer 104. In S807 a determination is made of whether sending of all of the print data is completed, and if determined to be incomplete, the processing returns to S803. When sending of all of the print data is determined to be complete in S807, the processing ends.

When determined in S802 that identification information has not been added, the print data is a candidate for saving. In this case, in S808, a determination is made of whether or not the print data is data to be saved, by referencing the saving target information 316, and comparing the referenced information to the print job information of the job to be printed. In the saving target information 316, conditions for the print job information (for example, a specific character string (a character string other than the above identification information) is included in the print job name, or the like) are set in advance. The identification information detection unit 309, based on the print job information, determines whether or not the print job agrees with the set conditions, and determines whether the data is to be saved. Thus, from the flowchart in FIG. 5, with respect to print data to which an identifier has not been added, it is possible to save not all data, but rather to selectively save specific data.

When determined in S808 that the print data is not to be saved, the print data is spooled in S809 in the same manner as in S803, and in S810, the print data spooled in S809 is sent to the printer 104. In S811 a determination is performed of whether sending of all of the print data is complete, and when determined to not be complete, the processing returns to S809. When sending of all of the print data is determined to be complete in S811, the processing ends.

On the other hand, when determined in S808 that the print data is to be saved, in S812, the saving management information creation unit 304 creates the saving management information 312 based on the print job information. The print job information accompanies the print job, and is included in the print job header or the like. The manner of generating the saving management information, according to an embodiment, will be described in detail below with reference to FIG. 11. In S813, the output management unit 311 spools the print data, and in S814, a determination is performed of whether or not spooling of the print data is completed. When determined in S814 that spooling of the print data is completed, in S817 the saving management unit 305 saves the print data as the print format form data 314 along with the saving management information in a saving directory that has been set in advance, and the processing proceeds to S815. When determined in S814 that spooling of the print data is not completed, the processing proceeds to S815, and in S815, the output management unit 311 sends the spooled print data to the printer 104. When determined in S816 that sending of the print data is not complete, the processing returns to S813. When determined in S816 that sending of the print data is complete, the processing ends.

<Saving Management Information>

Figure 10:
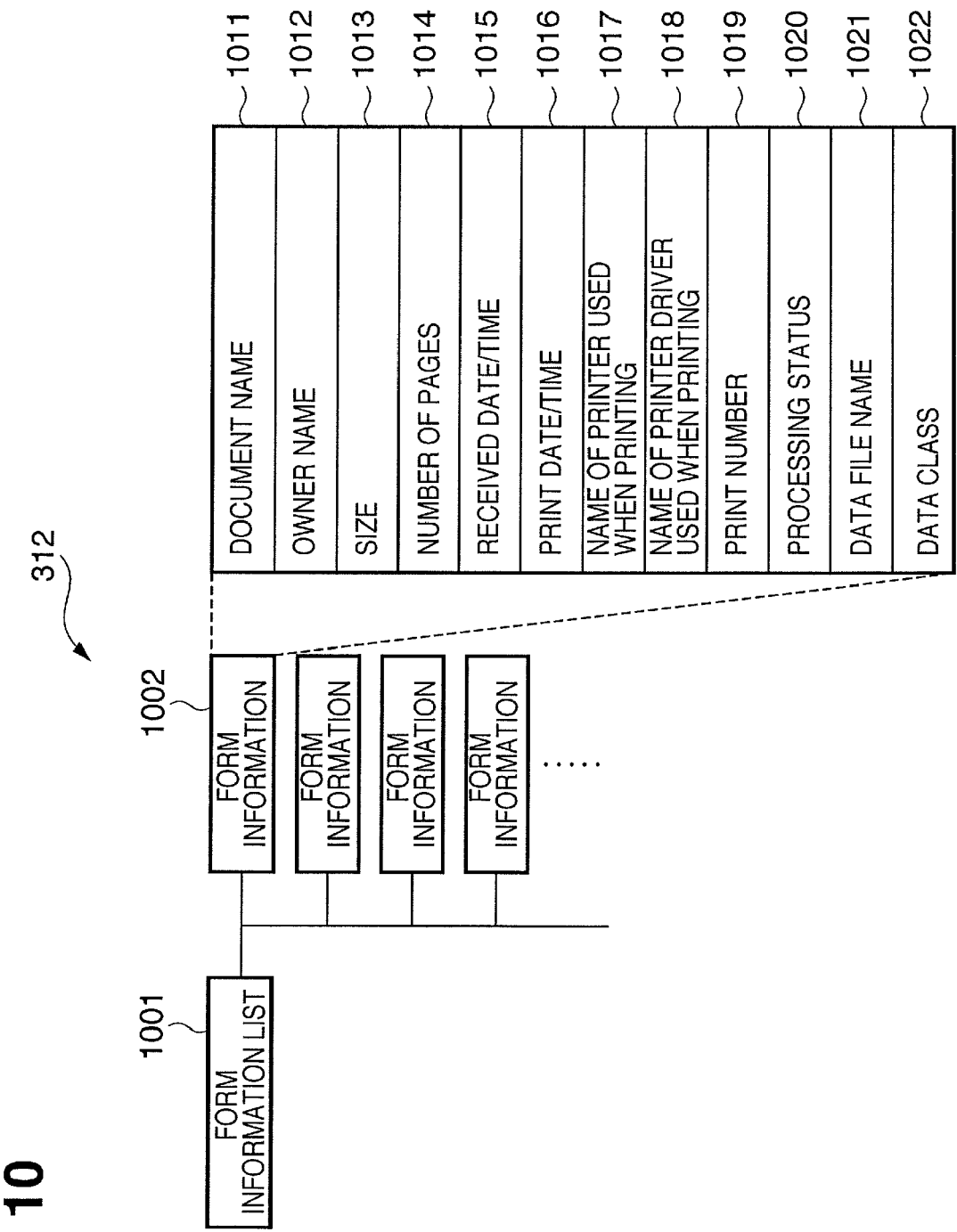
FIG. 10 shows a data structure of saving management information in the form printing system according to an embodiment of the invention.

FIG. 10 shows the data structure of the saving management information 312. In FIG. 10, the saving management information 312 holds a list 1001 of form information. Form information 1002 is information corresponding one-to-one with the application form data 313 or the print format form data 314 being held in the saving management unit 305. The form information 1002 includes a document name 1011, an owner name 1012, a size 1013, a number of pages 1014, a received date/time 1015, a print date/time 1016, a printer name 1017 of the printer used when printing, a printer driver name 1018 of the printer driver used when printing, a print number 1019, a processing status 1020, a data file name 1021, and a data class 1022.

In the case of the form data 313 generated with the form generation unit 303, the document name and the owner name are information given by the user at the time of form generation (default values if not given by the user). The size and the number of pages are information obtained in the course of the form generation unit 303 generating form data. The received date/time, the data file name, and the data class are information generated when the saving management information 312 was created with the saving management information creation unit 304. An identifier is set for the data class that indicates whether the data saved with the data file name is the application form data 313 or the print format form data 314. In the case that the saving management information creation unit 304 received data from the form creation unit 303 (the flow in FIG. 4), an identifier that indicates form data is set for the data class. In the case that the saving management information creation unit 304 received data from the output management unit 311 (the flow in FIG. 7), an identifier that indicates print data is set. The interface with which the saving management information creation unit 304 receives data from the form creation unit, and the interface with which the saving management information creation unit 304 receives data from the output management unit, are different, so this distinction is possible.

The print date/time, the name of the printer used when printing, the name of the printer driver used when printing, and the print number are set when printing is executed. As for the processing status, during print processing a status is set that indicates that print processing is presently being performed, and when printing is complete, a status is set that indicates that printing is complete (or, that print processing ended due to an error or due to cancellation).

Figure 11:
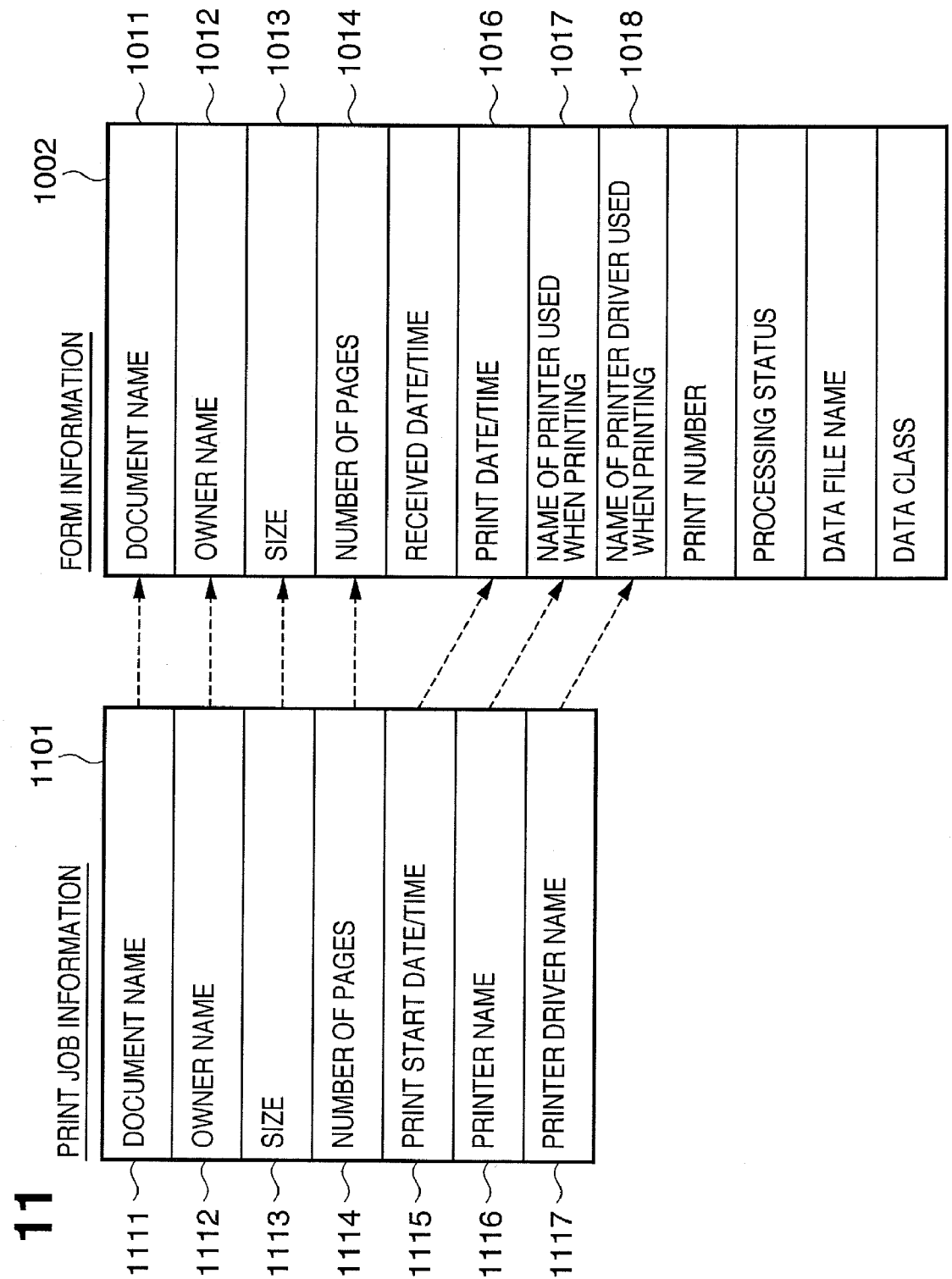
FIG. 11 illustrates how a saving management information creation unit creates saving management information from print job information, in the form printing system according to an embodiment of the invention.

FIG. 11 illustrates how the saving management information creation unit 304 creates the saving management information 312 based on print job information 1101, in S812 in FIG. 9. In this case, the document name 1111, the owner name 1112, the size 1113, and the number of pages 1114 are supplied by sending the print job information 1101 acquired from the Windows™ spooler 308 by the output management unit 311 to the saving management information creation unit 304. However, the number of pages is decided at the time that spooling in the output management unit is finished. Also, the print date/time 1115, the name of the printer 1116 used when printing, and the name of the printer driver 1117 used when printing likewise are supplied from the print job information. The received date/time, the print number, the processing status, the default file name, and the data class are set by the saving management information creation unit 304, and an identifier that indicates form data is set in the data class.

In the above manner, after converting the form data of a preexisting form processing system to print data, it is possible to save and manage that form data in print data format in a new form processing system. Thus, as described below, with the form processing system according to the invention, print format form data saved in a new form processing system can be reused.

<Browsing from Client>

Figure 12:
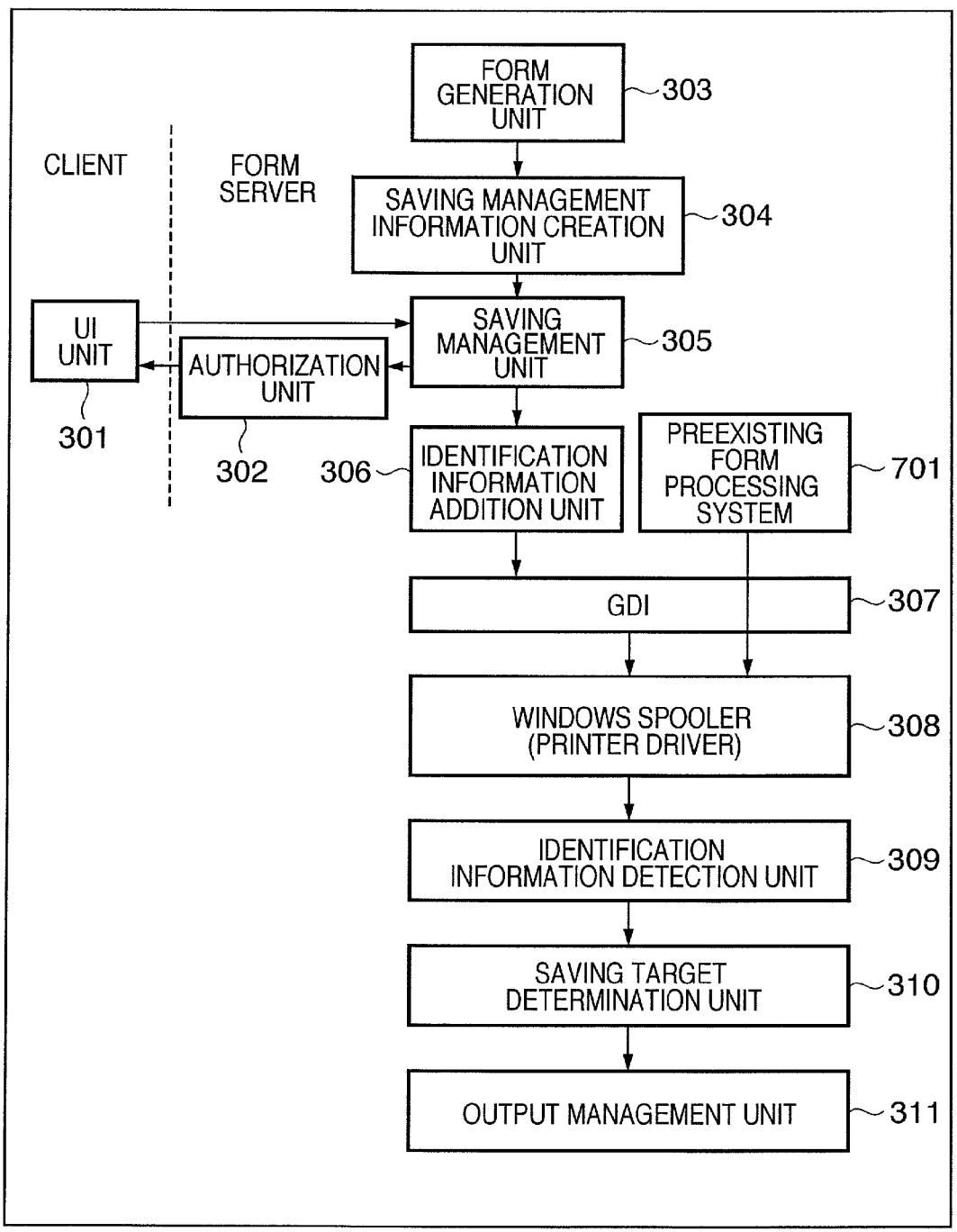
FIG. 12 shows a flow of processing to display, in a UI unit of a client terminal, a list of form data or print data saved in the saving management unit of the form saving server, in the form printing system according to an embodiment of the invention.

FIG. 12 shows the flow of processing to display, in the UI unit 301 of the client terminal 102, a list of form data or print data saved in the saving management unit 305 of the form saving server 101, in the form printing system in FIG. 1. In FIG. 12, the UI unit 301 of the client issues a request to view a list of form data to the saving management unit 305. The view request includes at least a user ID, and an access right class of "reading". The authorization unit 302 determines whether display is possible for each piece of form data included in the list, and sends a list of form data determined to be displayable to the UI unit 301.

Figure 13:
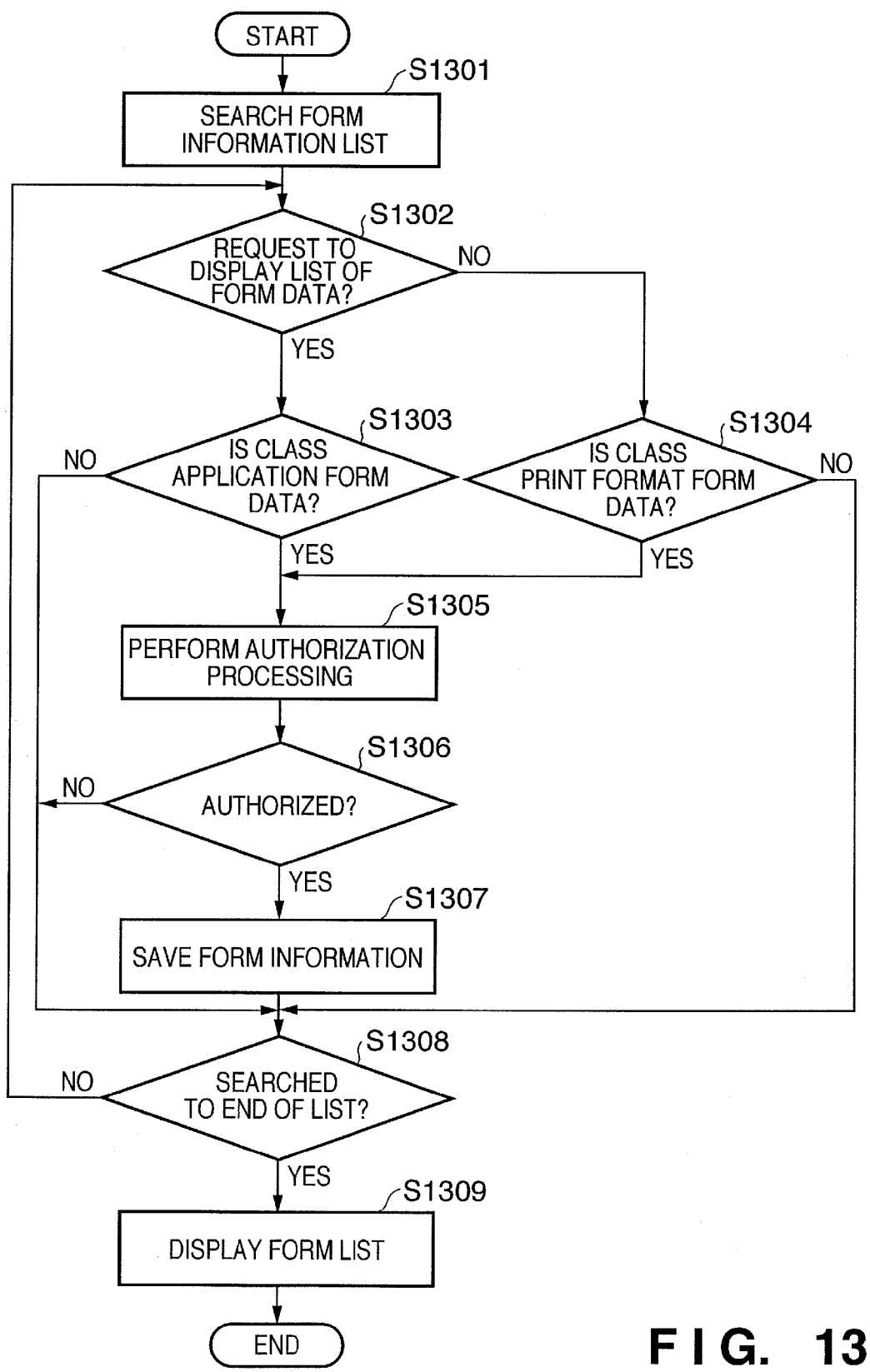
FIG. 13 is a flowchart showing the flow of processing in which the form saving server receives a request from a client terminal, and returns a list of form information to the client terminal, in the form printing system according to an embodiment of the invention.

FIG. 13 is a flowchart showing the flow of processing in which the form saving server 101 receives a request from the client terminal 102, and returns a list of form information to the client terminal 102, in FIG. 12. In this flowchart, S1301 to S1304, and S1308, are executed with the saving management unit 305, and S1305 and S1306 are executed with the authorization unit 302.

The following is a description of processing in which, in response to a request to display a list of form data that has been saved, a determination is made of whether to perform display based on authorization information, the determination being made for each piece of form data corresponding to an individual form, and a list of form data determined to be displayable is returned to the client terminal that was the source of the request.

After receiving a request from the UI unit 301 of the client terminal 102, the form saving server 101, in S1301, searches the form information list held by the saving management information 312 for the requested form information of the application form data 313 or the print format form data 314. In S1302, a determination is made of whether or not the request is for display of a list of the form data 313, and when the request is for display of a list of the form data 313, the processing proceeds to S1303. In S1303, a determination is made of whether or not the data class is the form data 313 by referencing the data class of the form information searched in S1301, and when determined not to be the form data 313, the data class is the print format form data 314, so processing proceeds to S1308. When determined in S1303 that the data class is the form data 313, in S1305 a determination is made of whether or not the user who made the request has a right to read, by referencing the authorization information 315 (details in FIG. 17). When determined in S1306 that the user has a right to read (i.e. that the user has a right to view), in S1307 the form information is saved as information to be returned to the UI unit 301 of the client terminal 102. To more specifically describe the authorization processing in S1305, using the user ID included in the print request, a determination is performed of whether the resources of the designated printer 104 and the document (313 or 314) are set so that usage is permitted or set so that usage is not permitted for the user ID. When determined in S1302 that the request is not for display of a list of the form data 313, the request is for display of a list of the print format form data 314, so processing proceeds to S1304. In S1304, a determination is performed of whether or not the data class is the print format form data 314, by referencing the data class of the form information searched in S1301. When determined that the data class is the print format form data 314, the processing proceeds to S1305. When determined that the data class is not the print format form data 314, the processing proceeds to S1308. In S1308, a determination is performed of whether or not a search was performed to the end of the form information list, and when determined that a search was not performed to the end of the form information list, the processing returns to S1302. When determined in S1308 that a search was performed to the end of the form information list, in S1309 the list of form information saved in S1307 is returned to the UI unit 301 of the client terminal 102 and displayed.

According to the flowchart in FIG. 13, it is possible to, in response to a request to display a list of form data that has been saved, determine whether or not to display that form data based on authorization information, the determination being made for each piece of form data corresponding to an individual form, and return a list of form data determined to be displayable to the source of the request to display the list.

FIG. 14 shows an example of a form list displayed in the UI unit 301 of the client terminal 102 based on the processing of the flowchart in FIG. 13. When "saved form" is selected in a tree display unit 1401, a list of the form data 313 is displayed in a list display unit 1402. That is, "saved form" displays application form data. When "PDL saved form" is selected in the tree display unit 1401, a list of the print format form data 314 is displayed in the list display unit 1402. That is, "PDL saved form" corresponds to print format form data.

When a subtree "non-printed form" of "saved form" or "PDL saved form" is selected, respectively, a list of the form data 313, or the print format form data 314 with a print number of 0 times is displayed in the list display unit 1402. Likewise, when the subtree "printed form" of "saved form" or "PDL saved form" is selected, respectively, a list of the form data 313, or the print format form data 314 with a print number of one or more times is displayed in the list display unit 1402.

Figure 15:
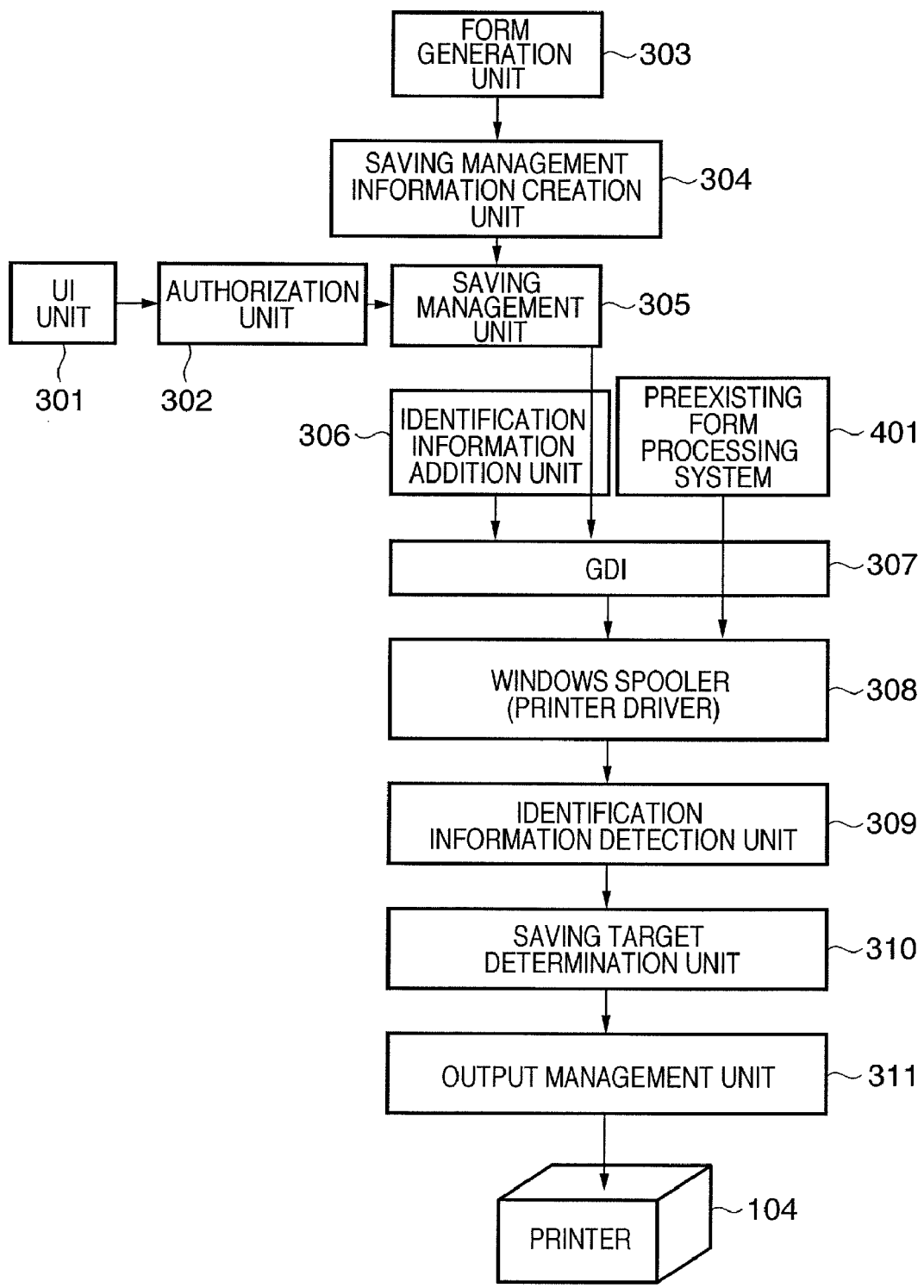
FIG. 15 shows the flow of processing to print, due to an instruction from a UI unit of a client terminal, form data or print data saved in the saving management unit of the form saving server, in the form printing system according to an embodiment of the invention.
Figure 16:
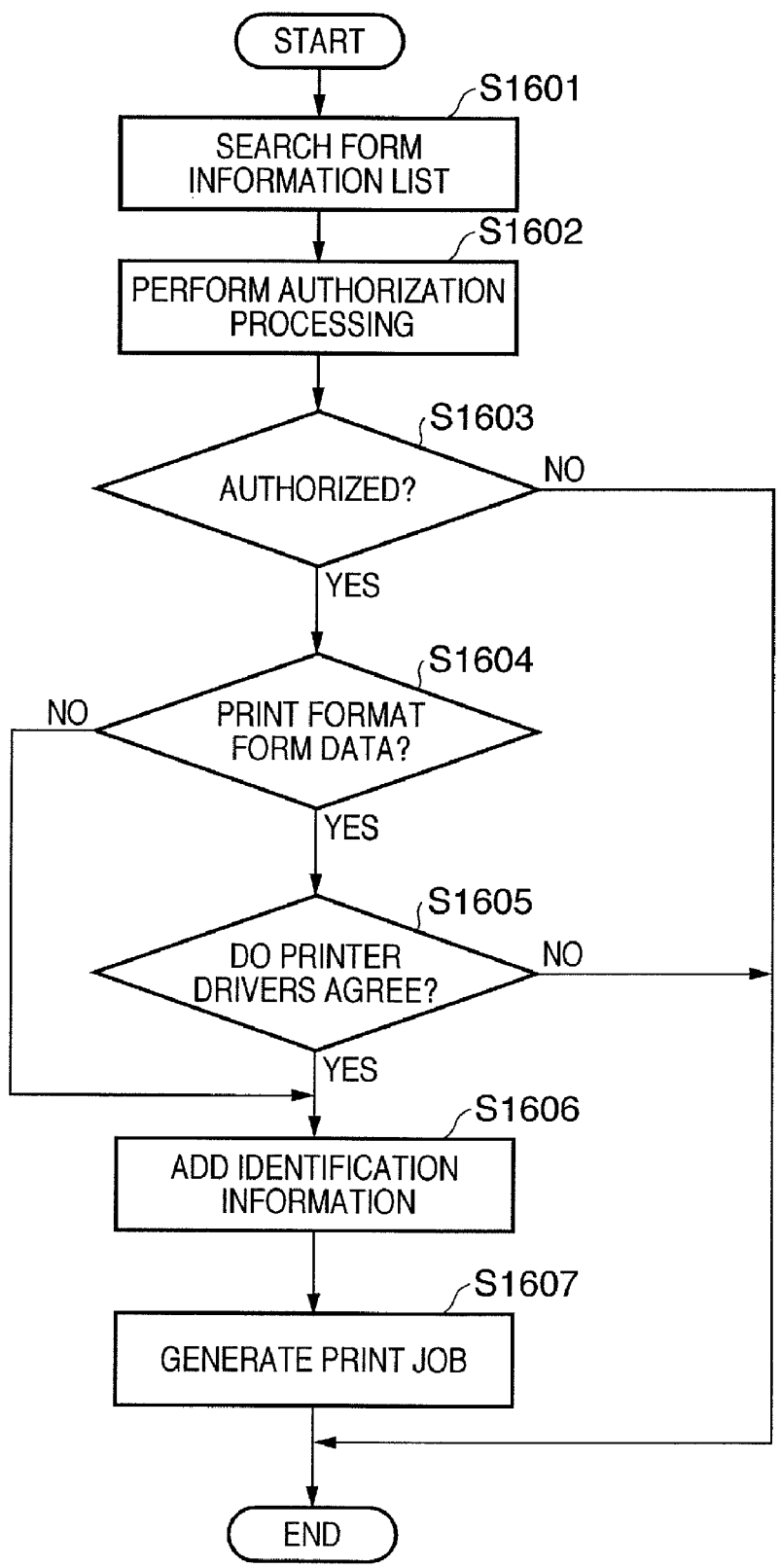
FIG. 16 is a flowchart showing the flow of processing in which the form saving server receives a request from a client terminal, generates a print job, and inputs the print job to a Windows™ spooler, in the form printing system according to an embodiment of the invention.

In this manner, the UI unit 301 has a function to display a list of the form information of the application form data 313, or the print format form data 314 saved on the form saving server 101. In addition, it is possible to designate the application form data 313 or the print format form data 314 and the print destination printer, so that a print request can be sent to the form saving server 101 (FIGS. 15 and 16). However, in the case of the print format form data 314, the data depends on the type of printer, so the print request will fail unless the same printer driver is used as when the print format form data 314 was initially saved. In the case of form data, the data does not depend on the type of printer, so there is not such a limitation. The UI unit 301 may also have functions to provide a preview display of designated form data 313, and to search for a character string included in the form data. However, in that case, when the print format form data 314 has been designated, there is the limitation that it is not possible to provide a preview display or to search for a character string in the print data.

<Print Request from Client>

FIG. 15 shows the flow of processing to print, due to an instruction from the UI unit 301 of the client terminal 102, form data saved in the saving management unit 305 of the form saving server 101, in the form printing system in FIG. 1. The form data to be printed includes application form data and print format form data.

In FIG. 15, when a request is made to print form data selected from a form position column displayed in the UIT unit 301 (including at least a user ID and an execution access right class), a determination is made with the authorization unit 302 of whether the user has that authority. If the user has the authority, that form data should be printed and so a print request is issued to the saving management unit 305. Below is the same as in FIG. 4.

FIG. 16 is a flowchart showing the flow of processing in which the form saving server 101 receives a request from the client terminal 102, generates a print job, and inputs the print job to the Windows™ spooler 308, in FIG. 15. In this flowchart, S1601 and S1604 to S1606 are executed with the saving management unit 305, S1602 and S1603 are executed with the authorization unit 302, and S1607 is executed with the identification information addition unit 306.

The processing in FIG. 16 begins from the time that the form saving server 101 received a request from the UI unit 301 of the client terminal 102. In S1601, the form saving server 101 searches in the form information list held by the saving management information 312 for the form information of the form data 313 or print format form data 314 for which a request was received. In S1602, a determination is performed of whether or not there is authority to execute printing of the form information searched for in S1601, namely the form data 313 or the print format form data 314, by referencing the authorization information 315. When determined in S1603 that there is no authority to execute printing, processing ends. In this case, an error message is displayed in the UI unit 301 of the client terminal 102 stating that there is no authority to execute printing. When determined in S1603 that there is authority to execute printing, in S1604 a determination is made of whether or not the form information searched for in S1601 is the print format form data 314. When determined in S1604 to not be the print format form data 314 (that is, determined to be the application form data 313), the processing proceeds to S1606. When determined in S1604 to be the print format form data 314, in S1605 a determination is performed of whether or not the printer driver name stored in the form information matches the printer driver name of the printer that will execute printing. When it is determined that the printer drivers do not match, the processing ends. In this case, an error message is displayed in the UI unit 301 of the client terminal 102 stating that the printer cannot execute printing. When determined in S1605 that the printer driver name stored in the form information matches the printer driver name of the printer that will execute printing, in S1606 a print job is generated. Then, in S1607, identification information indicating that the print job is a print of the print format form data 314 is added to the print job name, and then the processing ends. According to the aforementioned flowcharts in FIGS. 8 and 9, print processing is executed for the print job that has been input to the Windows™ spooler 308 according to the flowchart in FIG. 16.

Figure 17:
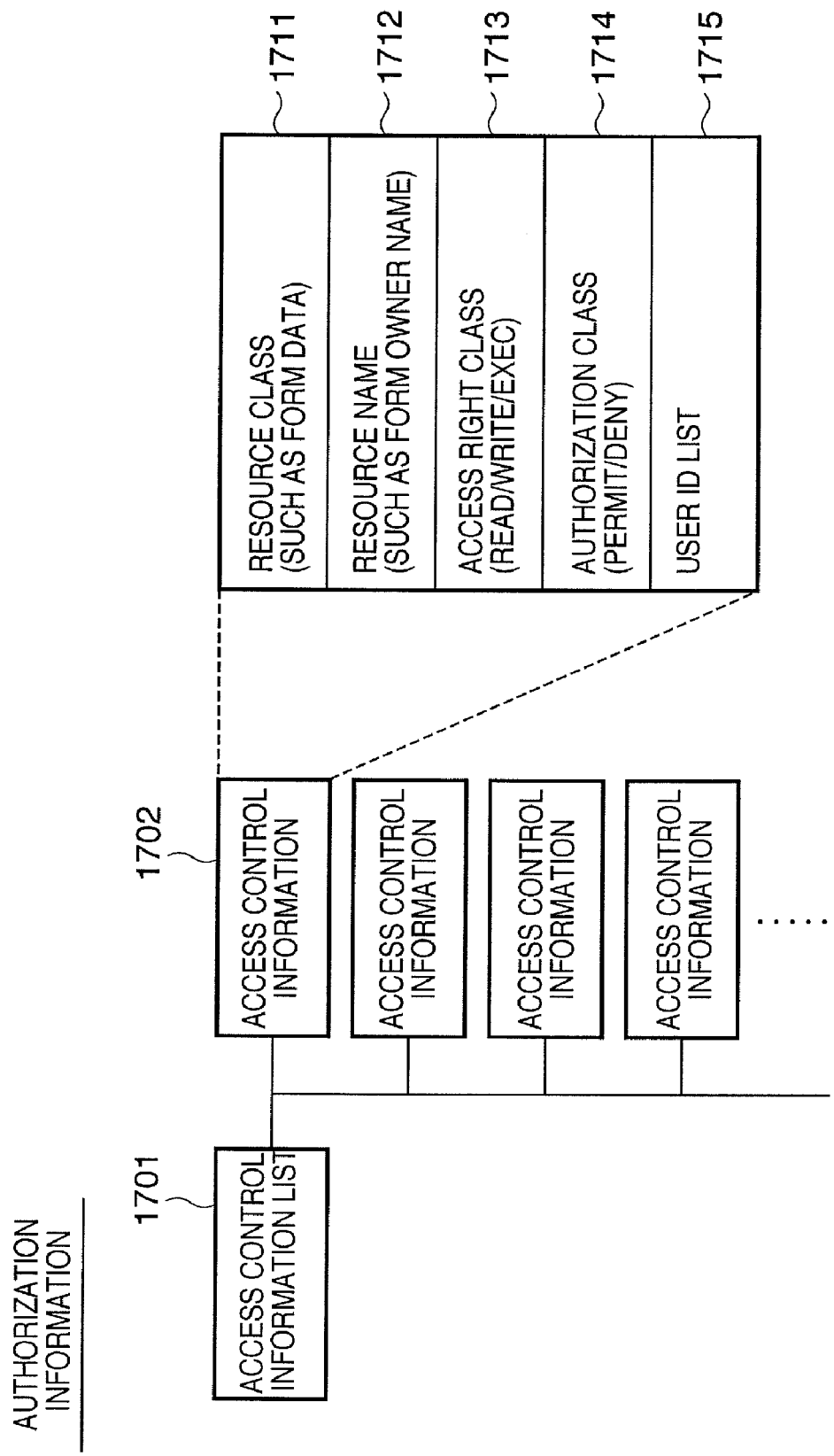
FIG. 17 shows the data structure of authorization information in the form printing system according to an embodiment of the invention.

FIG. 17 shows the data structure of the authorization information 315 referenced in S1305 in FIG. 13, and S1602 in FIG. 16. The authorization information 315 includes an access control list 1701, and access control information 1702 includes a resource class 1711, a resource name 1712, an access authorization class 1713, an authorization class 1714, and a user ID list 1715. The resource class 1711 indicates the resource class managed by the form saving server 101, and the form data or printer. The resource name 1712 indicates the owner name included in the form information in the case that the resource class is form data, and indicates the printer name in the case of a printer. The access right class 1713 indicates the class of access authorization necessary to execute a request to read, write, or execute. The authorization class 1714 indicates whether to permit or deny the access authorization indicated by the access authorization class. For example, settings are possible in which reading is permitted and writing is denied. A user ID list 1715 is a list of user IDs indicating users subject to access control. Access from a user whose user ID itself is not registered is denied regardless of the access class. In S1305 in FIG. 13 and S1602 in FIG. 16, a user ID that has made a request is searched for in the access control information of the resource requested, and a determination is made of whether to execute processing for the request.

When the user makes a print request or request a list of form data using a client terminal, designation of a user ID and the form data, designation of a printer (in the case of a print request), an access authorization class, and the like are included in the request. The authorization unit 302 that has received this request, using the user ID included in the request as a key, determines whether or not to permit the processing (the access authorization class) requested for the resource class (printer or form data) the user is attempting to use.

In this manner, in the form processing system according to the invention, after being converted to print data, form data created by another application or the like is saved along with saving management information such that the form data can be reused. The saved print data corresponds to the print format form data of the above embodiment, and can be saved and managed along with application form data created with the form generation unit. Thus, the user can select a desired form from form data that includes print format form data and application form data, and display or print the selected form. Further, form data that has been temporarily saved by the saving management unit can be moved out to another form processing system according to the invention without passing through the procedure of again performing print processing, and consequently that form data can be reused. Also, there may be instances when a user newly introduced to a preexisting form printing system has assets such as form formats that were accumulated in the past. In such a case as well, it is not necessary for the user to manage form data with a plurality of form processing systems; rather, it is possible for the user to easily use a newly introduced form processing system to centrally save and manage even form data created with a preexisting form processing system.

Second Embodiment

In the first embodiment described above, in the description of the flowchart in FIG. 9, a case was described in which saving and print output of form data are performed at the same time. However, the invention is not limited to such a case. For example, only saving may be performed. In this case, processing may be ended after executing S813 and then S817 in FIG. 9. Such a configuration is compatible with, for example, a case in which a user wishes to import form data of a former form processing system into a new form processing system without also performing print output.

Other Embodiments

Note that the present invention can be applied to an apparatus comprising a single device or to a system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, for example, as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-150588 filed on May 30, 2006, which is hereby incorporated by reference herein in its entirety.

What is claimed is:

1. An apparatus including an operating system for processing data input from an external form processing system, the apparatus comprising:
    a form generation unit configured to generate form data;
    a storage management unit configured to save the form data generated by the form generation unit in a saving unit;
    an identification information addition unit configured to, in a case where there is a request to print form data, add an identification information to a print job for printing the form data and then transfer the print job to the operating system;
    an identification information determination unit configured to receive output data output from the operating system, and determine whether the identification information has been added to the print job for printing the received output data; and
    an output management unit configured not to save the received output data output from the operating system in the saving unit in a case where the identification information determination unit has determined that the identification information has been added to the print job for printing the received output data, and to save output data output from the operating system in the saving unit as form data from the external form processing system in a case where the identification information determination unit has determined that the identification information has not been added to the print job for printing the received output data.

2. The apparatus according to claim 1, wherein the output management unit, in a case where the identification information determination unit has determined that the identification information has been added to the print job for printing the received output data, outputs the print job for printing received data output from the operating system to a printer without saving data output from the operating system in the saving unit.

3. The apparatus according to claim 1, further comprising:
    a management information creation unit configured to, based on print job information corresponding to the received output data, create management information as form data,
    wherein the output management unit saves the output data and management information in the saving unit.

4. The apparatus according to claim 1, further comprising:
    a first authorization unit configured to, in a case where a print request is received for form data designated from among the form data saved by the saving unit, and the print request has been authorized based on authorization information, transfer the form data to the identification information addition unit.

5. The apparatus according to claim 1, further comprising:
    a second authorization unit configured to, in response to a request to display a list of the form data saved by the saving unit, determine whether to display that form data based on authorization information, wherein the determination is made for each piece of form data corresponding to an individual form, and return a list of form data determined to be displayable to a source of the request to display the list.

6. The apparatus according to claim 1, further comprising:
    a saving determination unit configured to, in a case where the identification information determination unit has determined that the identification information has not been added to the print job for printing the received output data, further determine whether to save the data output from the operating system in the saving unit based on saving target information.

7. A method executed by an apparatus including an operating system for processing data input from an external form processing system the method comprising:
    generating form data;
    saving the generated form data in a saving unit;
    adding, in a case where there is a request to print form data, an identification information to a print job for printing the form data and then transferring the print job to the operating system;
    receiving output data output from the operating system and determining whether the identification information has been added to the print job for printing the received output data; and
    saving the output data output from the operating system in the saving unit as form data from the external form processing system only in a case where it has been determined that the identification information has not been added to the print job for printing the received output data.

8. The method according to claim 7, further comprising:
    outputting, in a case where it is determined that the identification information has been added to the print data for printing the received output data, the print job for printing the received data output from the operating system to a printer without saving the output data in the saving unit.

9. The method according to claim 7, further comprising:
    generating management information as form data based on print job information corresponding to the form data, wherein the form data and management information are saved in the saving unit.

10. The method according to claim 7, further comprising:
    adding, in a case where a print request is received for form data designated from among the form data saved by the saving unit and the print request has been authorized based on authorization information, an identifier to the form data.

11. The method according to claim 10, further comprising:
    determining, in response to a request to display a list of the form data saved by the saving unit, whether to display that form data based on authorization information, wherein the determination is made for each piece of form data corresponding to an individual form; and returning a list of form data determined to be displayable to a source of the display request.

12. The method according to claim 7, further comprising:
determining, in a case where it is determined that the identification information has not been added to the print job for printing for printing the received output data, whether to save the data output from the operating system in the saving unit based on saving target information.

13. A non-transitory computer-readable medium storing a program causing an apparatus including an operating system for processing data input from an external processing system, to perform a method, the method comprising:
generating form data;
saving the generated form data in a saving unit;
adding, in a case where there is a request to print form data, an identification information to a print job for printing the form data and then transferring the print job to the operating system;
receiving output data output from the operating system and determining whether the identification information has been added to the print job for printing the received output data; and
saving the output data output from the operating system in the saving unit as form data from the external form processing system only in a case where it has been determined that the identification information has not been added to the print job for printing the received output data.

14. The non-transitory computer-readable medium according to claim 13, further comprising:
outputting, in a case where it is determined that the identification information has been added to the print data for printing the received output data, the print job for printing the received data output from the operating system to a printer without saving the output data in the saving unit.

15. The non-transitory computer-readable medium according to claim 13, further comprising:
generating management information as form data based on print job information corresponding to the form data, wherein the form data and management information are saved in the saving unit.

16. The non-transitory computer-readable medium according to claim 13, further comprising:
adding, in a case where a print request is received for form data designated from among the form data saved by the saving unit and the print request has been authorized based on authorization information, an identifier to the form data.

17. The non-transitory computer-readable medium according to claim 13, further comprising:
determining, in response to a request to display a list of the form data saved by the saving unit, whether to display that form data based on authorization information, wherein the determination is made for each piece of form data corresponding to an individual form; and
returning a list of form data determined to be displayable to a source of the display request.

18. The non-transitory computer-readable medium according to claim 13, further comprising:
determining, in a case where it is determined that the identification information has not been added to the print job for printing for printing the received output data, whether to save the data output from the operating system in the saving unit based on saving target information.

\* \* \* \* \*